(12) United States Patent
Yu et al.

(10) Patent No.: US 8,058,622 B2
(45) Date of Patent: Nov. 15, 2011

(54) PHOTOMULTIPLIER TUBE INTERFACE DEVICE

(75) Inventors: Shih-Fan Yu, Longtan Township, Taoyuan County (TW); Tzong-Dar Wu, Longtan Township, Taoyuan County (TW); Meei-Ling Jan, Longtan Township, Taoyuan County (TW)

(73) Assignee: Institute of Nuclear Energy Research Atomic Energy Council, Executive Yuan, Taoyuan County (TW)

( * ) Notice: Subject to any disclaimer, the term of this patent is extended or adjusted under 35 U.S.C. 154(b) by 616 days.

(21) Appl. No.: 12/078,456

(22) Filed: Mar. 31, 2008

(65) Prior Publication Data
US 2009/0242777 A1 Oct. 1, 2009

(30) Foreign Application Priority Data
Oct. 25, 2007 (TW) ................................. 96140014 A

(51) Int. Cl.
*G01T 1/20* (2006.01)

(52) U.S. Cl. ...................................................... 250/369
(58) Field of Classification Search ................... 250/369
See application file for complete search history.

(56) References Cited

U.S. PATENT DOCUMENTS
5,525,794 A * 6/1996 Gibbons ........................ 250/207
6,472,664 B1 * 10/2002 Kyushima et al. ............ 250/366
* cited by examiner

*Primary Examiner* — David Porta
*Assistant Examiner* — Carolyn Igyarto
(74) *Attorney, Agent, or Firm* — WPAT., P.C.; Justin I. King

(57) ABSTRACT

The present invention provides a photomultiplier tube interface device (PMT), comprising a PMT module and a circuit substrate. The PMT module comprises a plurality of pins formed at a front end. A plurality of contacts are disposed on a lateral side of the circuit substrate to be electrically connected to the plurality of pins while a connecting base is arranged at a peripheral portion on another lateral side of the circuit substrate to be electrically connected to the contacts. By means of the interface device, not only the connecting pins of the PMT can be protected from being damaged and generating high frequency noise but also the convenience for assembling or replacing the PMT can be improved.

16 Claims, 9 Drawing Sheets

PHOTOMULTIPLIER TUBE INTERFACE DEVICE

BACKGROUND OF THE INVENTION

1. Field of the Invention

The present invention generally relates to an interface device and, more particularly, to a photomultiplier tube (PMT) interface device.

2. Description of the Prior Art

The positron emission tomography (PET) scan has been developed since Browell's work on the positron scintillation camera in 1953. In 1975, Ter-Pogossian developed positron emission transaxial tomography (PETT), using a scintillation detector comprising scintillation crystals at the front end to convert the γ-ray photons into scintillation signals. On the back end, there is a photomultiplier tube comprising a photocathode to convert the scintillation signals into photoelectrons by the photoelectric effect. The photoelectrons bombard the dynode, which is applied with 200-400 volts, to generate secondary electrons. The secondary electrons multiply after bombarding a plurality of dynodes and will be collected by the anode to cause a pulse signal. The magnitude of the pulse signal is proportional to the number of scintillation photoelectrons received by the photocathode. A weak optical signal can be amplified by a photomultiplier tube and the amplification depends on the voltage applied on the dynode.

In early PET systems, the sodium iodide NaI(Tl) crystal is used. However, the NaI(Tl) crystal is not suitable for use in converting the γ-ray photons into scintillation signals when the photon energy reaches 511 keV, unless the thickness of the NaI(Tl) crystal with lowered imaging resolution. The BGO (bismuth germanate, $Bi_3Ge_4O_{12}$) crystal is widely used in modern PET systems because the BGO crystal exhibits higher efficiency. The LSO (lutetium oxyorthosilicate) crystal exhibits higher density, higher stopping power and higher conversion efficiency than the BGO crystal. However, the LSO crystal is not as widely used as the BGO because of its cost and bottleneck issues in manufacture.

Please refer to FIG. 1, which is 3-D schematic diagram of a conventional scintillation crystal detecting module. The conventional scintillation crystal detecting module 1 comprises a scintillation crystal unit 10, a PMT module 11 and a circuit substrate 13. The scintillation crystal unit 10 comprises a plurality of scintillation crystals formed of NaI, LSO or BGO arranged in an array. One end of the PMT module 11 is coupled to the scintillation crystal unit 10 to receive an optical signal from the scintillation crystal unit 10 and then convert the optical signal into an electrical signal. At another end, the PMT module 11 comprises a plurality of pins 12 to be electrically connected to the circuit substrate 13. The circuit substrate 13 is a circuit board. There are contacts 14 on the circuit board to be connected to the pins 12. At the center of the circuit substrate 13, a connecting base 15 is provided. The connecting base 15 is connected to the contacts 14 and provides a terminal 150 for connection with an imaging system (for example, a PET imaging system or a SPECT imaging system).

However, the conventional scintillation crystal detecting module 1 has some problems such as:

1. Since there is no protection between the pins 12 and the circuit substrate 13, the pins 12 are possibly damaged and exposed to cause high-frequency noise. Moreover, it is possible that the user touches the pins 12 to cause hazards.

2. The pins 12 of the PMT module 11 are welded to the circuit substrate 13. Therefore, it is inconvenient to assemble and replace a mal-functional PMT when any PMT in the PMT module 11 is damaged or aged.

3. The circuit substrate 13 can be further connected to another circuit substrate 16 using the connecting base 15 with a pin header. Therefore, the connection between the circuit substrate 13 and the circuit substrate 16 is unfixed and requires additional screws for fixation, which increases the substrate area.

4. In order to prevent the PMT pins 12 from contacting the circuitry on the circuit substrate 13, the PMT pins 12 have to be concave inwards, which results in unfixed connection between the PMT pins 12 and the circuit substrate 13.

Therefore, there is need in providing a PMT interface device and a scintillation crystal detecting module using the PMT interface device to overcome the aforementioned problems.

SUMMARY OF THE INVENTION

It is an object of the present invention to provide to a PMT interface device, using a base interposed between each photomultiplier tube and the contacts to protect the pins of the photomultiplier tube and achieve flexibility in assembly and replacement of the photomultiplier tube.

It is another object of the present invention to provide to a PMT interface device, using a connecting base arranged at a peripheral portion of the interface device to be electrically connected to the PMT module. The connecting base protects the pins of the photomultiplier tube and enables the interface device to be connected to other substrates with more convenience.

In one embodiment, the present invention provides a photomultiplier tube (PMT) interface device, comprising: a PMT module, comprising a plurality of pins at a front end; and a circuit substrate, comprising a plurality of contacts disposed on a lateral side to be electrically connected to the plurality of pins and a connecting base arranged at a peripheral portion on another lateral side to be electrically connected to the contacts.

In another embodiment, the present invention provides a scintillation crystal detecting module, comprising: a scintillation crystal unit; a PMT module, coupled to the scintillation crystal unit and comprising a plurality of pins at a front end; and a circuit substrate, comprising a plurality of contacts disposed on a lateral side to be electrically connected to the plurality of pins and a connecting base arranged at a peripheral portion on another lateral side to be electrically connected to the contacts.

In another embodiment, there is a base interposed between each photomultiplier tube and the contacts.

In another embodiment, there are a plurality of vias on the circuit substrate to be connected to the contacts so that the pins pass through the vias.

BRIEF DESCRIPTION OF THE DRAWINGS

The objects, spirits and advantages of the preferred embodiments of the present invention will be readily understood by the accompanying drawings and detailed descriptions, wherein.

DETAILED DESCRIPTION OF THE PREFERRED EMBODIMENT

The present invention can be exemplified but not limited by the preferred embodiment as described hereinafter.

Figure 2:
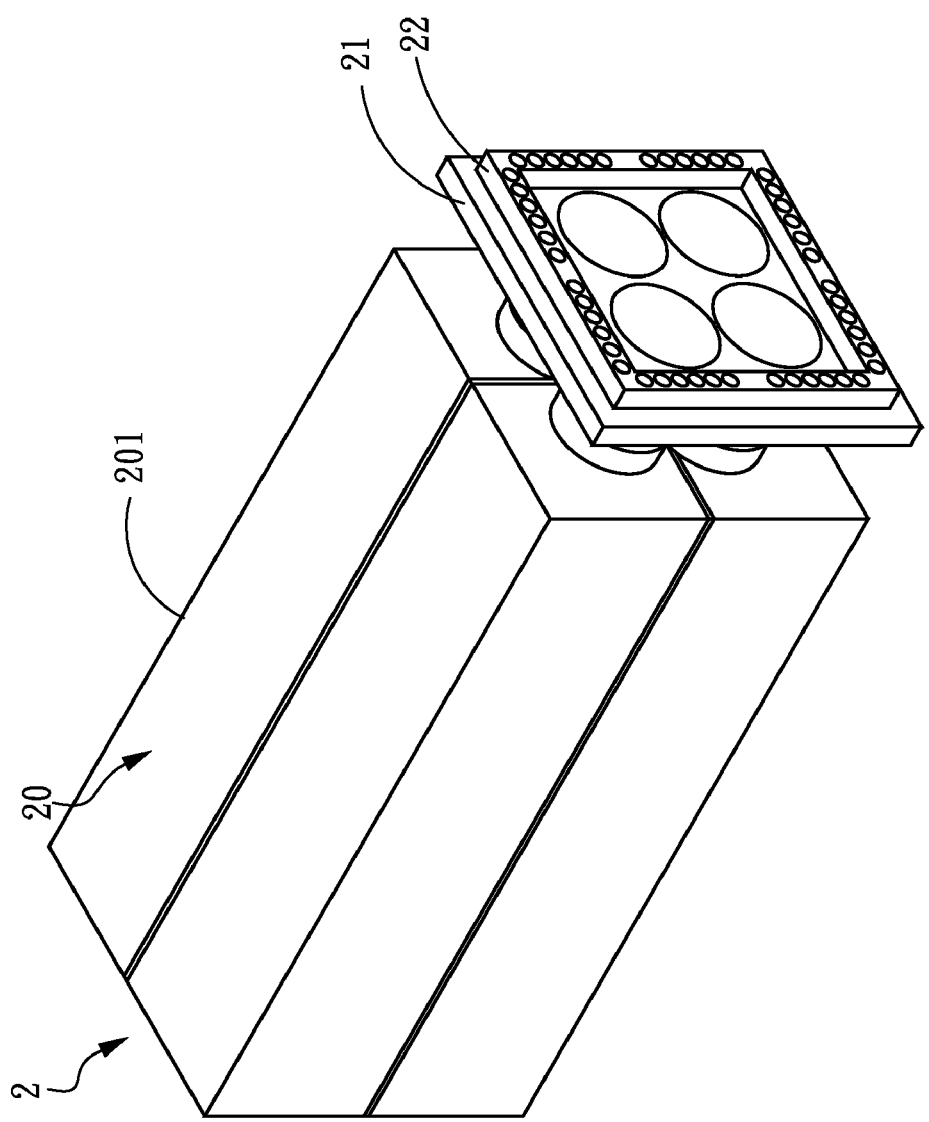
FIG. 2 is a 3-D schematic diagram of a PMT interface device according to one embodiment of the present invention.
Figure 8:
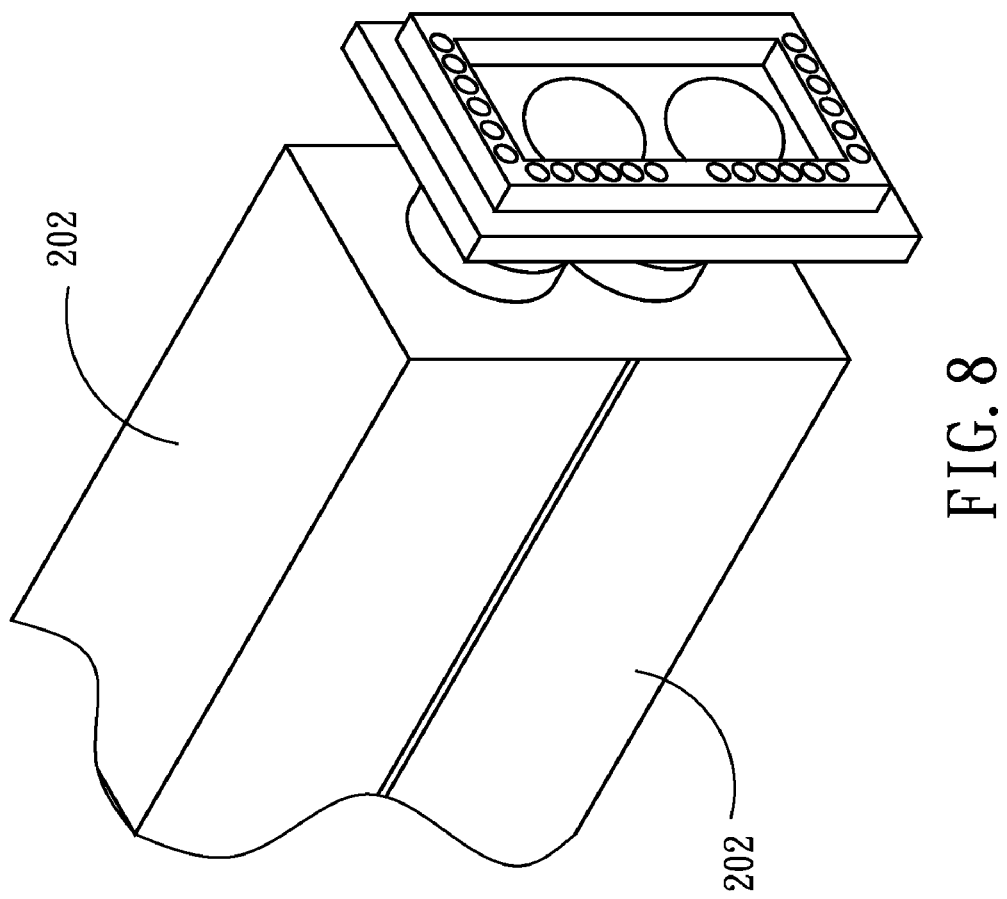
FIG. 8 is a 3-D schematic diagram of a PMT module according to another embodiment of the present invention.

Please refer to FIG. 2, which is a 3-D schematic diagram of a PMT interface device according to one embodiment of the present invention. In the present embodiment, the PMT interface device 2 comprises a PMT module 20 and a circuit substrate 21. The PMT module 20 comprises a plurality of photomultiplier tubes 201. In the present embodiment, a PMT module 20 comprises four photomultiplier tubes 201. The number of photomultiplier tubes in one PMT module 20 is determined according to actual requirement and is not limited to the embodiment of the present invention. For example, please refer to FIG. 8, which is a 3-D schematic diagram of a PMT module according to another embodiment of the present invention. In the present embodiment, the PMT module comprises two photomultiplier tubes 202.

Figure 3:
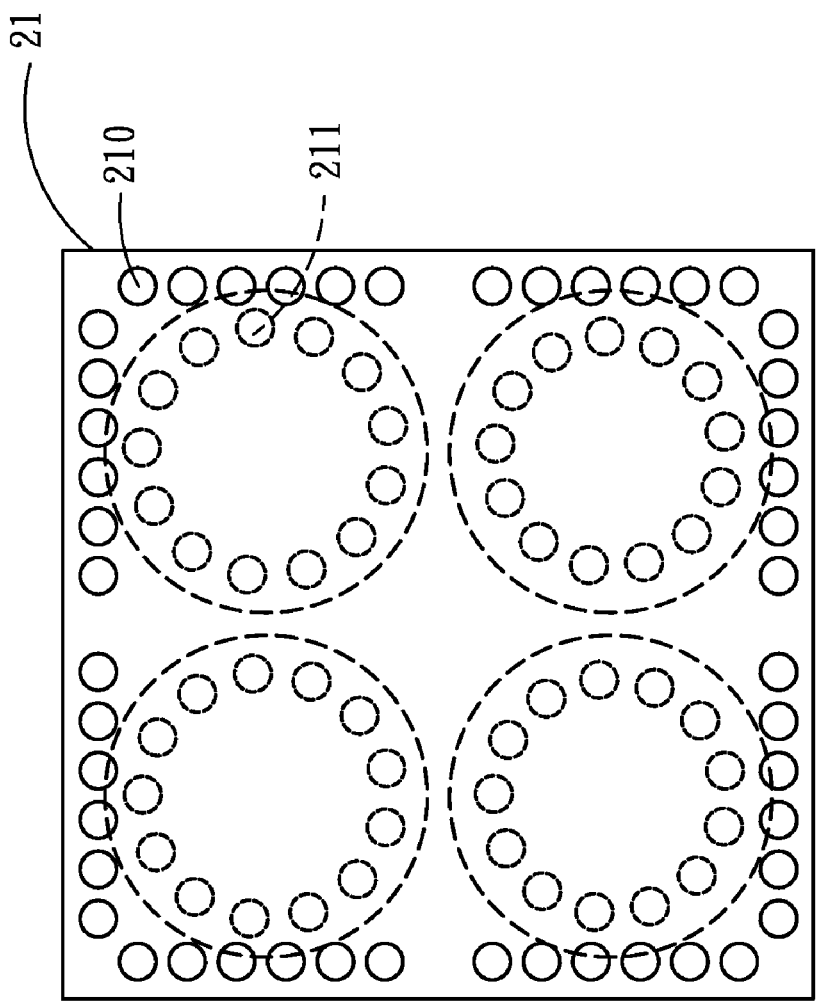
FIG. 3 is a schematic diagram showing the contacts on a circuit substrate according to the present invention.
Figure 4:
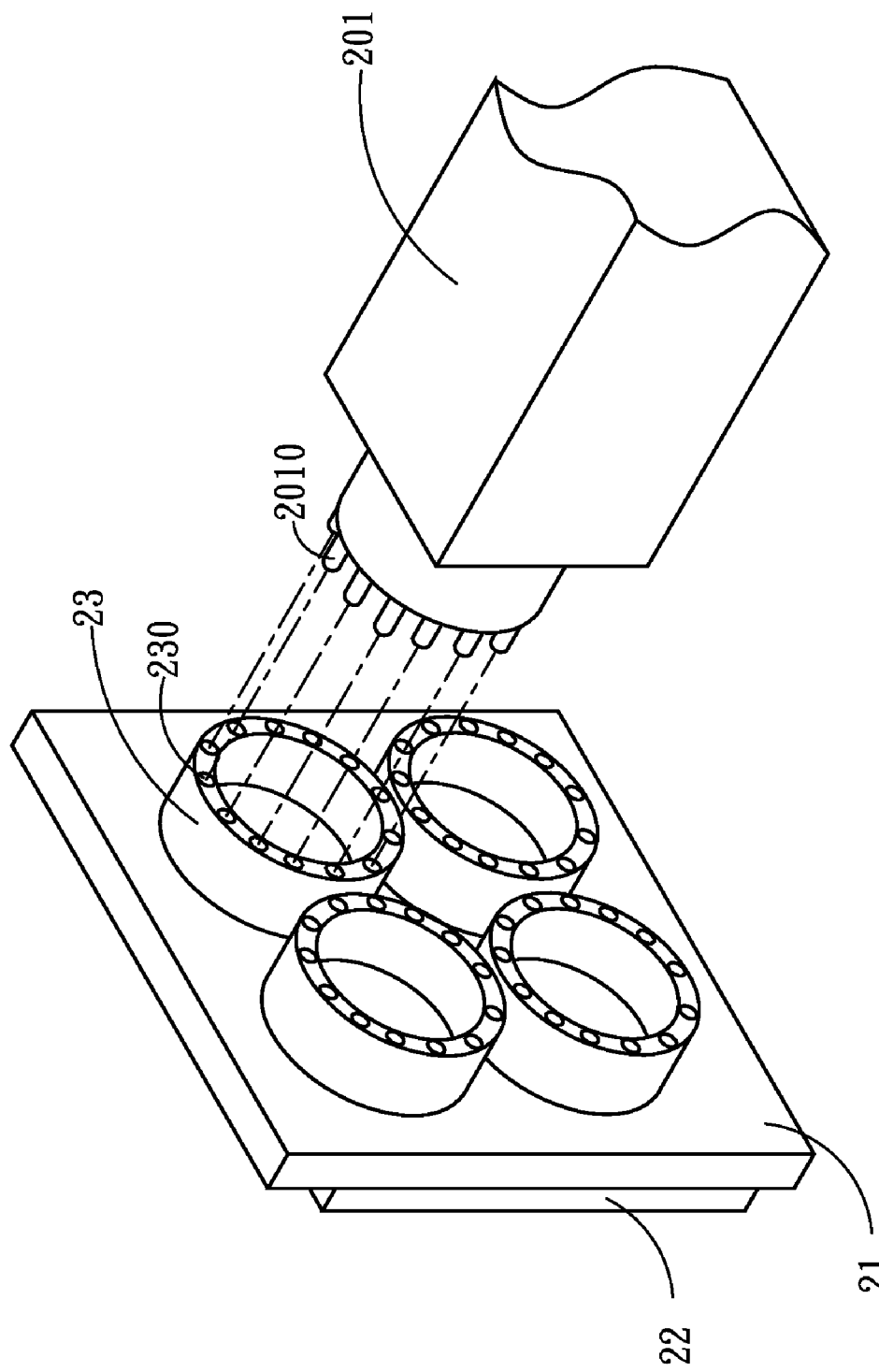
FIG. 4 is a 3-D schematic diagram showing the assembly of a PMT and the base on a circuit substrate according to one embodiment of the present invention.

Please refer to FIG. 3 and FIG. 4, wherein FIG. 3 is a schematic diagram showing the contacts on a circuit substrate according to the present invention and FIG. 4 is a 3-D schematic diagram showing the assembly of a PMT and the base on a circuit substrate according to one embodiment of the present invention. In FIG. 4, the PMT module is exemplified by one photomultiplier tube 201. Each photomultiplier tube 201 comprises a plurality of pins 2010 at a front end. In FIG. 3, the circuit substrate 21 comprises a plurality of contacts 211 disposed on a lateral side facing the PMT module. The circuit substrate 21 comprises four bases 23, each comprising a plurality of sockets 230. Each base 23 corresponds to a photomultiplier tube 201. The sockets 230 on the base 23 correspond to the pins 2010 on the photomultiplier tube 201 to hold the pins 2010.

Figure 5A:
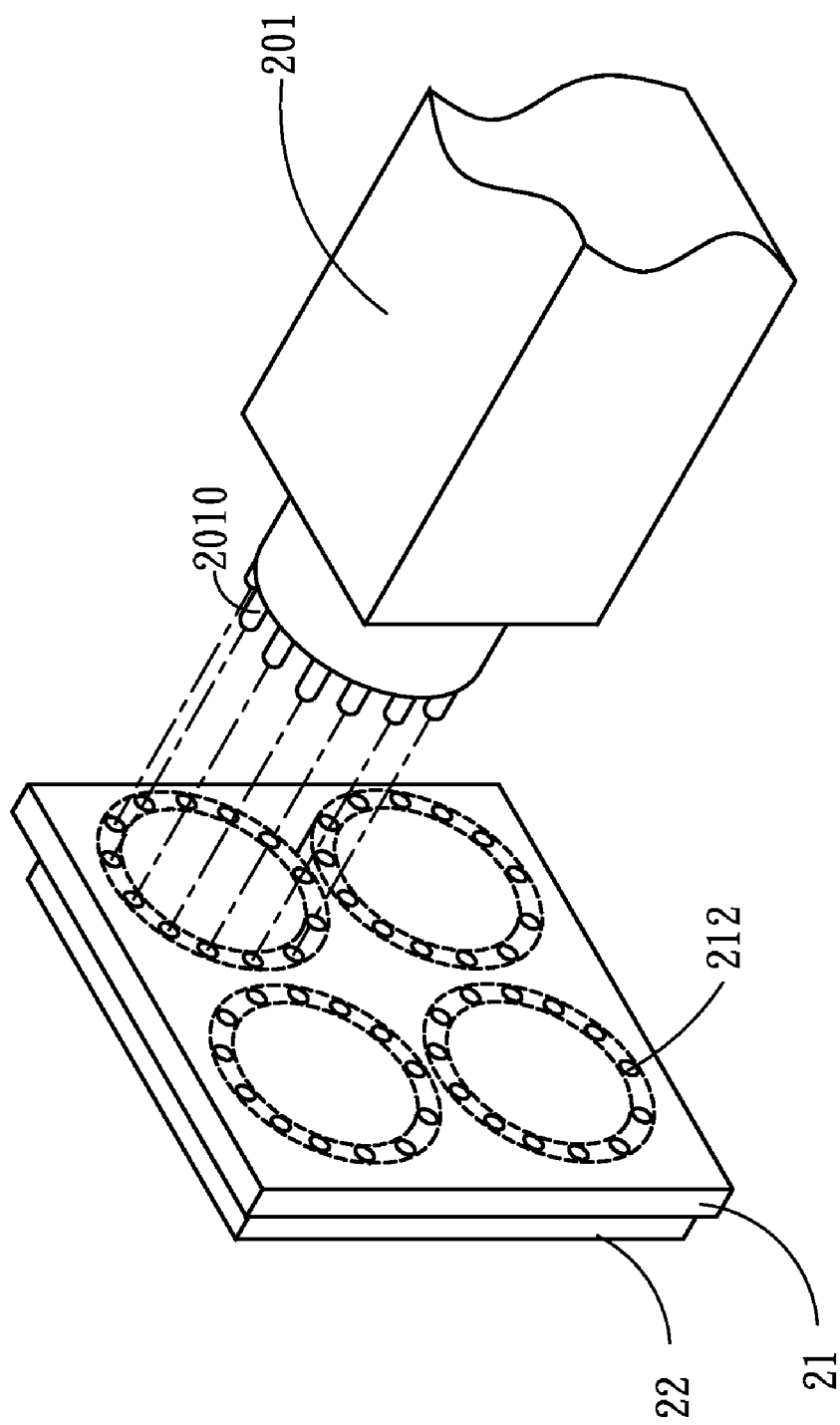
FIG. 5A and FIG. 5B are 3-D schematic diagrams showing the assembly of a PMT and a circuit substrate according to another embodiment of the present invention.
Figure 5B:
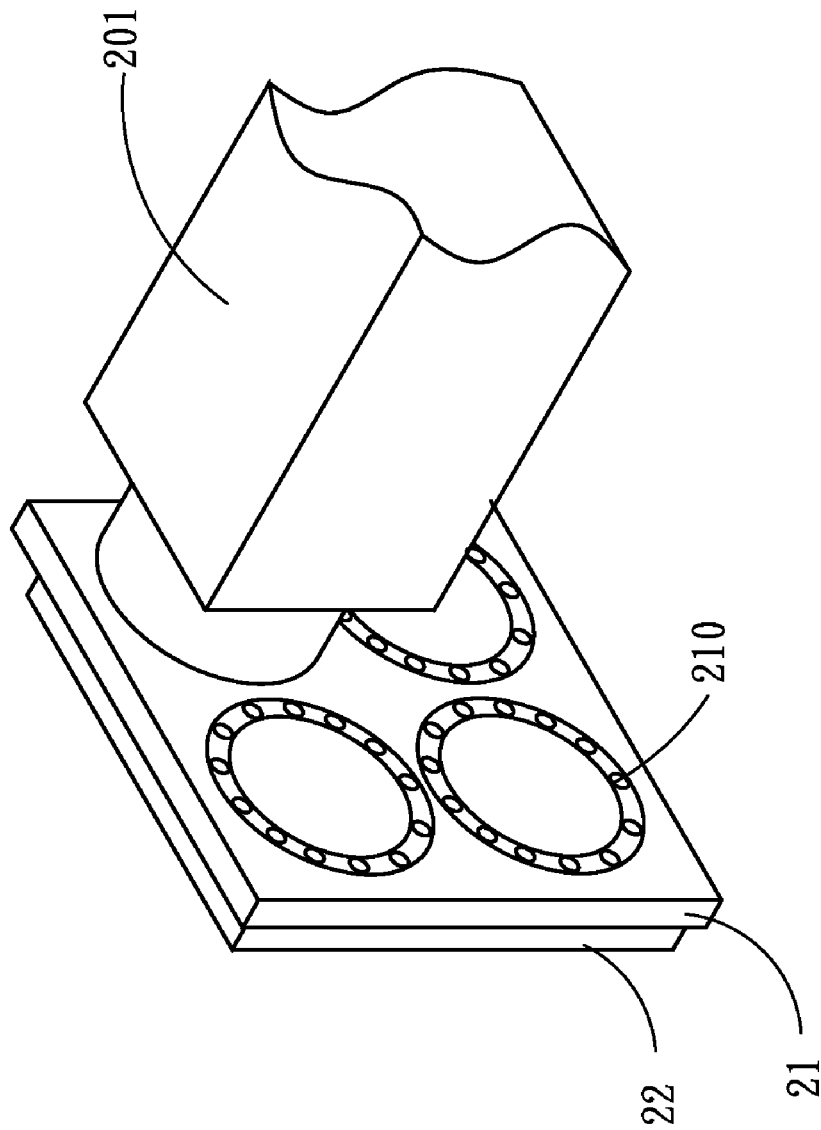

Please refer to FIG. 5A and FIG. 5B, which are 3-D schematic diagrams showing the assembly of a PMT and a circuit substrate according to another embodiment of the present invention. In addition to the embodiment shown in FIG. 4, a plurality of vias 212 can be provided on the circuit substrate 21 so as to be electrically connected to the contacts 211 in FIG. 3. The pins 2010 of the photomultiplier tube 201 can pass through the vias 212 so that the pins 2010 insert into the vias 212 to fix the photomultiplier tube 201, as shown in FIG. 5. In this manner, the pins 2010 can be prevented to be exposed to cause high-frequency noise or other hazards. By using the design as shown in FIG. 4 and FIG. 5, the issues resulting from welding can be prevented so that the assembly, replacement, and repair become easy and convenient.

Figure 1:
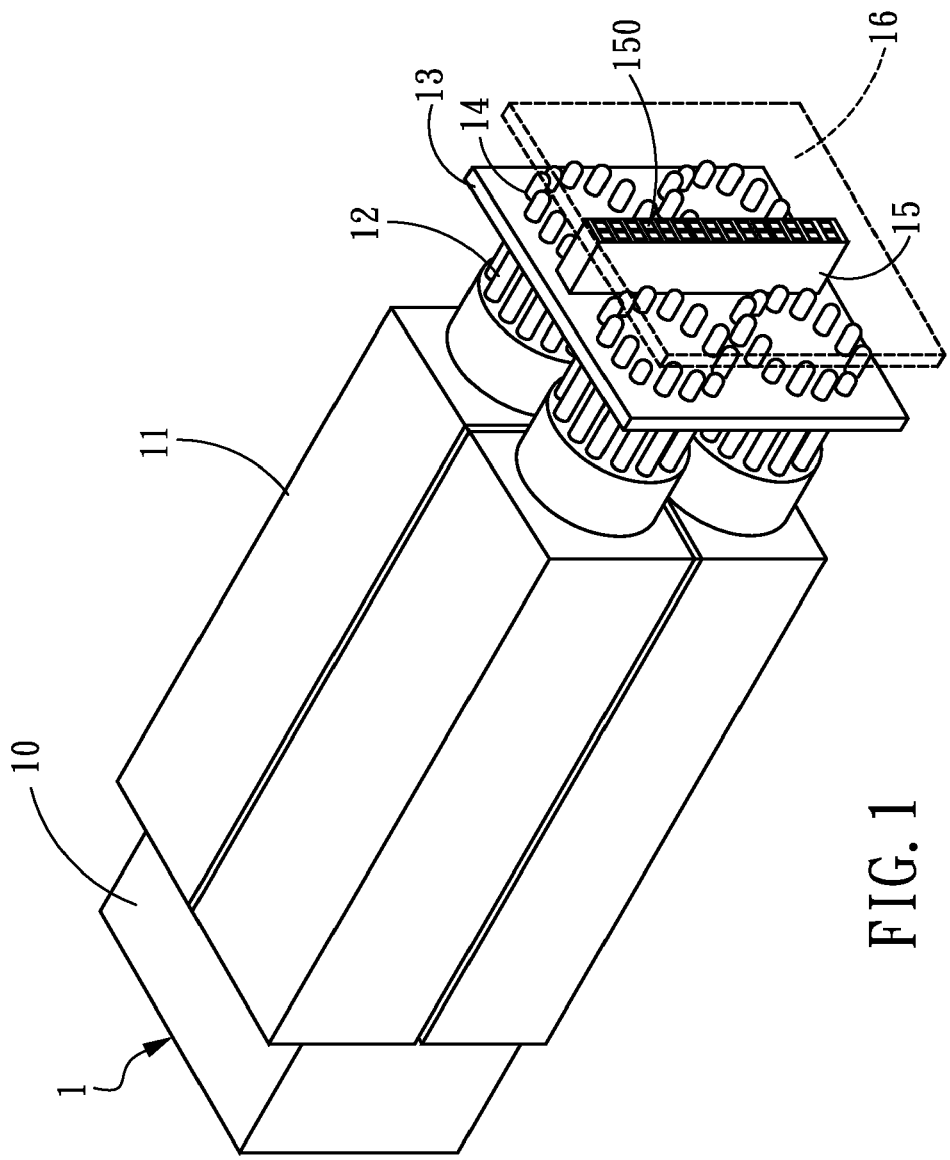
FIG. 1 is a 3-D schematic diagram of a conventional scintillation crystal detecting module.

Returning to FIG. 2 and FIG. 3, a connecting base 22 is arranged at a peripheral portion on another lateral side of the circuit substrate 21 to be electrically connected to the interface contacts 210 on the circuit substrate 21. The interface contacts 210 and the contacts 211 are electrically connected so that the connecting base 22 and the photomultiplier tube 201 are electrically connected. In the present embodiment, the connecting base 22 is exemplified by but not limited to a rectangular ring-shaped connecting base. Unlike FIG. 1 wherein the connecting base 15 is disposed at the center to cause problems when circuitry layout is implemented, the circuit substrate 21 is capable of providing more space for the follow-up circuitry layout using the connecting base 22.

Figure 6:
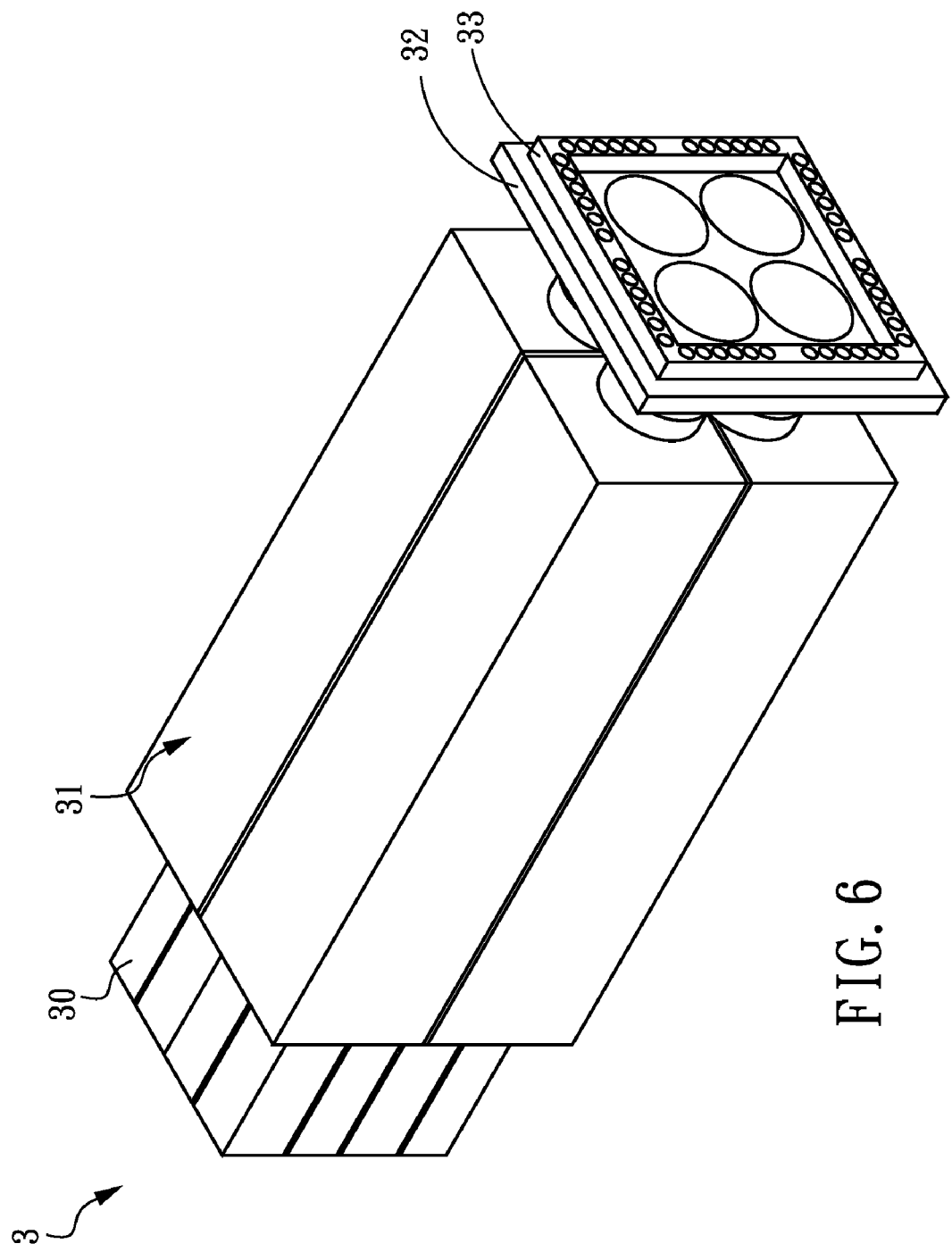
FIG. 6 is a 3-D schematic diagram of a scintillation crystal detecting module according to one embodiment of the present invention.

Please refer to FIG. 6, which is a 3-D schematic diagram of a scintillation crystal detecting module according to one embodiment of the present invention. In the present embodiment, the scintillation crystal detecting module 3 comprises a scintillation crystal unit 30, a PMT module 31 and a circuit substrate 32. The scintillation crystal detecting module 3 can be used in positron emission tomography (PET) or single photon emission tomography (SPET). However, the present is not limited thereto. The cooperation between the scintillation crystal unit 30 and the PMT module 31 is well known to those in the art and thus description thereof is not provided hereinafter. The scintillation crystal unit 30 comprises a plurality of scintillation crystals arranged in an array. In the present embodiment, the scintillation crystal is formed of sodium iodide (NaI), bismuth germanate (BGO), lutetium oxyorthosilicate (LSO), or the like. The PMT module 31, the circuit substrate 32, and the connecting base 33 are similar to those corresponding elements shown in FIG. 2 and thus description thereof is not provided hereinafter.

Figure 7:
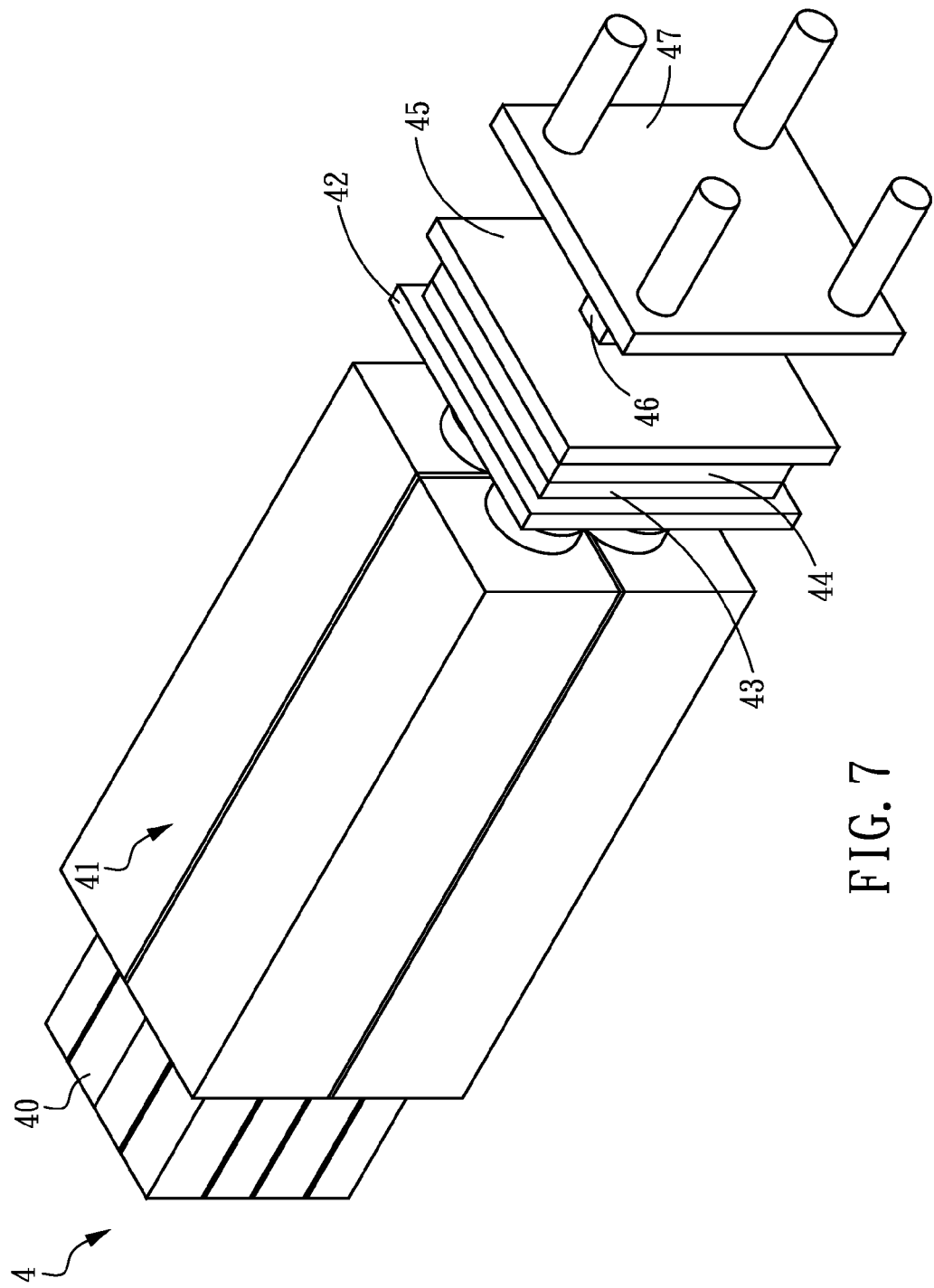
FIG. 7 is a 3-D schematic diagram of a scintillation crystal detecting module according to another embodiment of the present invention.

Please refer to FIG. 7, which is a 3-D schematic diagram of a scintillation crystal detecting module according to another embodiment of the present invention. In the present embodiment, the scintillation crystal detecting module 4 comprises a scintillation crystal unit 40, a PMT module 41, a first circuit substrate 42, a second circuit substrate 45 and a third circuit substrate 47. The scintillation crystal unit 40, the PMT module 41 and the first circuit substrate 42 are similar to those in FIG. 6 and thus description thereof is not provided hereinafter. The second circuit substrate 45 comprises a connecting base 44 on one lateral side so as to be electrically connected to a connecting base 43 on the first circuit substrate 42. Since the connecting base 43 is coupled to the connecting base 44, the connection between the first circuit substrate 42 and the second circuit substrate 45 is firm enough to protect the pins of the photomultiplier tube from being exposed. The third circuit substrate 47 is coupled to the second circuit substrate 45 using a fastener 46. The second circuit substrate 45 and the third circuit substrate 47 are integrated to achieve multifunctional circuitry design for signal processing. Moreover, the first circuit substrate 42 and the second circuit substrate 45 are capable of providing the center portions for the follow-up circuitry layout using the ring-shaped connecting base 43 to downsize the circuit area.

According to the above discussion, it is apparent that the present invention discloses a PMT interface device and a scintillation crystal detecting module using the PMT interface device to protect the PMT pins and achieve easy assembly and replacement. Therefore, the present invention is novel, useful and non-obvious.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A photomultiplier tube (PMT) interface device, comprising:

a PMT module, comprising a plurality of pins at a front end; and a circuit substrate, comprising a plurality of contacts disposed on a lateral side to be electrically connected to the plurality of PMT module pins and a connecting base situated on an opposite lateral side of the circuit substrate having a plurality of peripherally arranged interface contacts electrically connected to the contacts, such that the PMT module pins pass through a plurality of holes in the circuit substrate to connect to the respective contacts in such a way that the plurality of pins are isolated and shielded from high-frequency noise and other hazards by encapsulating the plurality of pins.

2. The PMT interface device as recited in claim 1, wherein the PMT module further comprises a plurality of photomultiplier tubes, each photomultiplier tube comprising the plurality of pins at the front end.

3. The PMT interface device as recited in claim 2, wherein there is a base interposed between each photomultiplier tube and the contacts.

4. The PMT interface device as recited in claim 1, wherein the PMT module further comprises four photomultiplier tubes, each photomultiplier tube comprising the plurality of pins at the front end.

5. The PMT interface device as recited in claim 4, wherein there is a base interposed between each photomultiplier tube and the contacts.

6. The PMT interface device as recited in claim 1, wherein there are a plurality of vias on the circuit substrate to be connected to the contacts so that the pins pass through the vias.

7. A scintillation crystal detecting module, comprising:
a scintillation crystal unit;
a PMT module, coupled to the scintillation crystal unit and comprising a plurality of pins at a front end; and
a circuit substrate, comprising a plurality of contacts disposed on a lateral side to be electrically connected to the plurality of PMT module pins and a connecting base situated on an opposite lateral side of the circuit substrate having a plurality of peripherally arranged interface contacts electrically connected to the contacts, such that the PMT module pins pass through a plurality of holes in the circuit substrate to connect to the respective contacts in such a way that the plurality of pins are isolated and shielded from high-frequency noise and other hazards encapsulating the plurality of pins.

8. The scintillation crystal detecting module as recited in claim 7, wherein the PMT module further comprises a plurality of photomultiplier tubes, each photomultiplier tube, comprising the plurality of pins at the front end.

9. The scintillation crystal detecting module as recited in claim 8, wherein there is a base interposed between each photomultiplier tube and the contacts.

10. The scintillation crystal detecting module as recited in claim 7, wherein the PMT module further comprises four photomultiplier tubes, each photomultiplier tube comprising the plurality of pins at the front end.

11. The scintillation crystal detecting module as recited in claim 10, wherein there is a base interposed between each photomultiplier tube and the contacts.

12. The scintillation crystal detecting module as recited in claim 7, wherein the scintillation crystal unit is a scintillation crystal array.

13. The scintillation crystal detecting module as recited in claim 7, wherein the scintillation crystal unit is formed of sodium iodide (NaI) scintillation crystal.

14. The scintillation crystal detecting module as recited in claim 7, wherein the scintillation crystal unit is formed of BGO scintillation crystal.

15. The scintillation crystal detecting module as recited in claim 7, wherein the scintillation crystal unit is formed of LSO scintillation crystal.

16. The scintillation crystal detecting module as recited in claim 7, wherein there are a plurality of vias on the circuit substrate to be connected to the contacts so that the pins pass through the vias.

* * * * *